(12) United States Patent
Pala

(10) Patent No.: US 8,648,702 B2
(45) Date of Patent: Feb. 11, 2014

(54) COMBINED TIME-OF-FLIGHT AND IMAGE SENSOR SYSTEMS

(75) Inventor: Silviu Pala, Birmingham, MI (US)

(73) Assignee: DENSO International America, Inc., Southfield, MI (US)

( * ) Notice: Subject to any disclaimer, the term of this patent is extended or adjusted under 35 U.S.C. 154(b) by 254 days.

(21) Appl. No.: 12/860,092

(22) Filed: Aug. 20, 2010

(65) Prior Publication Data

US 2012/0044093 A1 Feb. 23, 2012

(51) Int. Cl.
*B60Q 1/00* (2006.01)

(52) U.S. Cl.
USPC ........... 340/435; 340/903; 340/937; 348/148; 348/149; 701/301

(58) Field of Classification Search
USPC ................... 340/903, 937, 435; 348/148, 149; 701/301
See application file for complete search history.

(56) References Cited

U.S. PATENT DOCUMENTS

| | | | | |
|---|---|---|---|---|
| 6,150,956 | A * | 11/2000 | Laufer | 340/903 |
| 6,720,938 | B2 * | 4/2004 | Ohkawara et al. | 345/7 |
| 7,375,620 | B2 * | 5/2008 | Balbale et al. | 340/435 |
| 7,683,954 | B2 | 3/2010 | Ichikawa et al. | |
| 7,719,410 | B2 * | 5/2010 | Labuhn et al. | 340/435 |
| 7,741,961 | B1 * | 6/2010 | Rafii et al. | 340/435 |
| 2004/0109299 | A1 | 6/2004 | Burdick, Jr. et al. | |
| 2006/0203092 | A1 * | 9/2006 | Nobori et al. | 348/148 |
| 2009/0040306 | A1 * | 2/2009 | Foote et al. | 348/148 |
| 2009/0254260 | A1 * | 10/2009 | Nix et al. | 701/96 |
| 2010/0053327 | A1 * | 3/2010 | Nakayama et al. | 348/148 |
| 2010/0053592 | A1 | 3/2010 | Yahav et al. | |
| 2012/0236150 | A1 * | 9/2012 | Camilleri et al. | 348/148 |

FOREIGN PATENT DOCUMENTS

| | | |
|---|---|---|
| CN | 1184991 A | 6/1998 |
| CN | 2507707 Y | 8/2002 |
| CN | 1506658 A | 6/2004 |
| CN | 101652627 A | 2/2010 |
| DE | 10 2009 045 233 | 4/2011 |
| DE | 10 2010 055 865 | 7/2011 |
| GB | 2320326 A | 6/1998 |
| JP | 59131282 | 7/1984 |
| JP | 2000-184368 | 6/2000 |
| JP | 2008-89346 | 4/2008 |
| JP | 2009-59258 | 3/2009 |
| JP | 2009-265803 | 11/2009 |

OTHER PUBLICATIONS

Office Action issued May 6, 2013 in Chinese Application No. 201110240307.5 (with English translation).
Office Action dated Nov. 7, 2013 issued in the corresponding German application No. 10 2011 052 815.6 with English translation thereof.

* cited by examiner

*Primary Examiner* — Brent Swarthout
(74) *Attorney, Agent, or Firm* — Harness, Dickey & Pierce, P.L.C.

(57) ABSTRACT

An object detection system of a vehicle includes a time-of-flight (TOF) sensor that receives a reflected object detection signal at a second time based on an object detection signal transmitted at a first time. An image sensor generates an image signal including an image of a detected object. The image sensor is distinct from and adjacent to the TOF sensor. A TOF control module generates distance data based on the first time and the second time and determines whether at least a portion of a detected object is within a predetermined distance of the vehicle. An image control module generates image data based on the image signal. A detection control module correlates the distance data with the image data to generate a warning indicator when at least a portion of the detected object is within the predetermined distance of the vehicle.

25 Claims, 8 Drawing Sheets

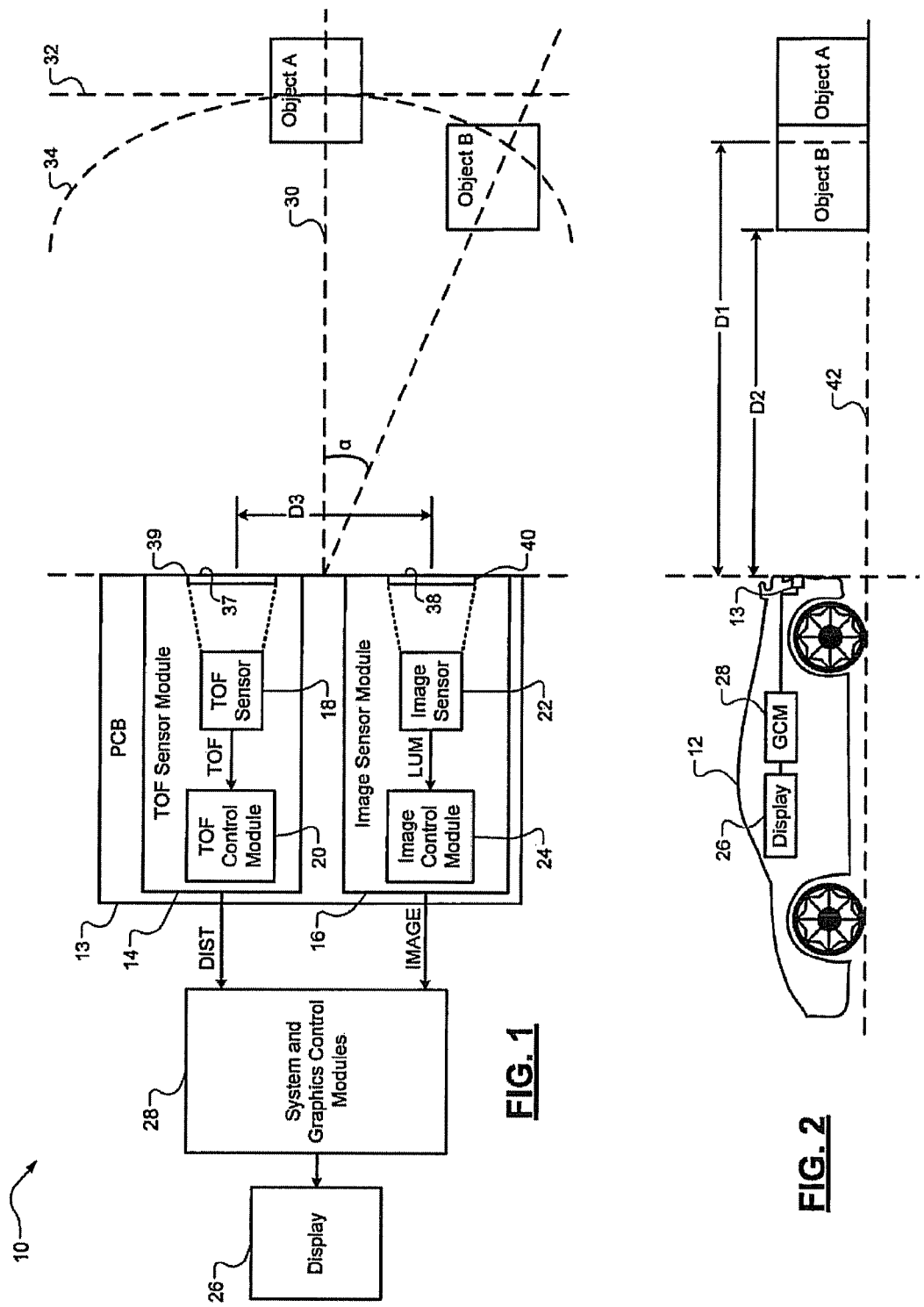

COMBINED TIME-OF-FLIGHT AND IMAGE SENSOR SYSTEMS

FIELD

The present disclosure relates to time-of-flight sensor systems and image sensing systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Object detection systems are used, for example, on vehicles to detect objects forward, rearward or on a side of a vehicle. The object detection sensors may be used during parking maneuvers, when cruise control is active, and/or to detect an oncoming vehicle. Two examples of an object detection system are a time-of-flight (TOF) system and an image sensing system.

A TOF system includes at least one TOF sensor, which is used to detect a distance between the sensor and an object. Example TOF sensors are radar sensors and near infrared spectroscopy sensors. A TOF system measures the amount of time for a signal transmitted from the TOF system to travel to an object, reflect off of the object and return to the TOF sensor. As such, a TOF system may be used to detect distances between, for example, a vehicle and objects in an environment surrounding the vehicle.

An image sensing system may include image sensors, such as a charge-coupled device (CCD) or an array of complementary metal-oxide-semiconductor (CMOS) active-pixel sensors. The image sensors convert an optical image to an electric signal, which is used to generate an image representing an environment forward, rearward, and/or on a side of a vehicle. Image data from the image sensors may be used to detect objects in the environment of the vehicle.

SUMMARY

An object detection system of a vehicle is provided and includes a time-of-flight (TOF) sensor. The TOF sensor that receives a reflected object detection signal at a second time based on an object detection signal transmitted at a first time. An image sensor generates an image signal including an image of a detected object. The image sensor is distinct from and adjacent to the TOF sensor. A TOF control module generates distance data based on the first time and the second time and determines whether at least a portion of a detected object is within a predetermined distance of the vehicle. An image control module generates image data based on the image signal. A detection control module correlates the distance data with the image data to generate a warning indicator when at least a portion of the detected object is within the predetermined distance of the vehicle.

In other features, an object detection system is provided and includes a substrate. The substrate includes a TOF sensor with N pixel sensors. The TOF sensor receives a reflected TOF signal at a second time based on a TOF signal transmitted at a first time. N is an integer. An image sensor includes M pixel sensors distinct from the N pixel sensors and generates an image signal and that is adjacent to the TOF sensor, where M is an integer. A TOF control module generates distance data based on the first time and the second time and determines whether at least a portion of a detected object is within a predetermined distance of a vehicle. An image control module generates image data based on the image signal. A detection control module correlates the distance data with the image data to generate a first warning indicator when at least a portion of the detected object is within the predetermined distance of the vehicle.

In yet other features, a method of operating an object detection system is provided and includes generating a correspondence matrix between TOF pixel sensors of a TOF sensor and image pixel sensors of an image sensor. Distance data is received from the TOF sensor. Image data is received from the image sensor. The distance data is compared to a warning distance and a warning indicator is generated. A first correspondence is determined between a first subset of the TOF pixel sensors and at least one of the image pixel sensors and pixels of a display. The first subset of the TOF pixel sensors is associated with distances of a detected object that are within the warning distance. The detected object and the warning indicator are displayed according to the first correspondence.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 is a top view of an object detection system of a vehicle;

FIG. 2 is a side view of the object detection system of FIG. 1;

DETAILED DESCRIPTION

Figure 3:
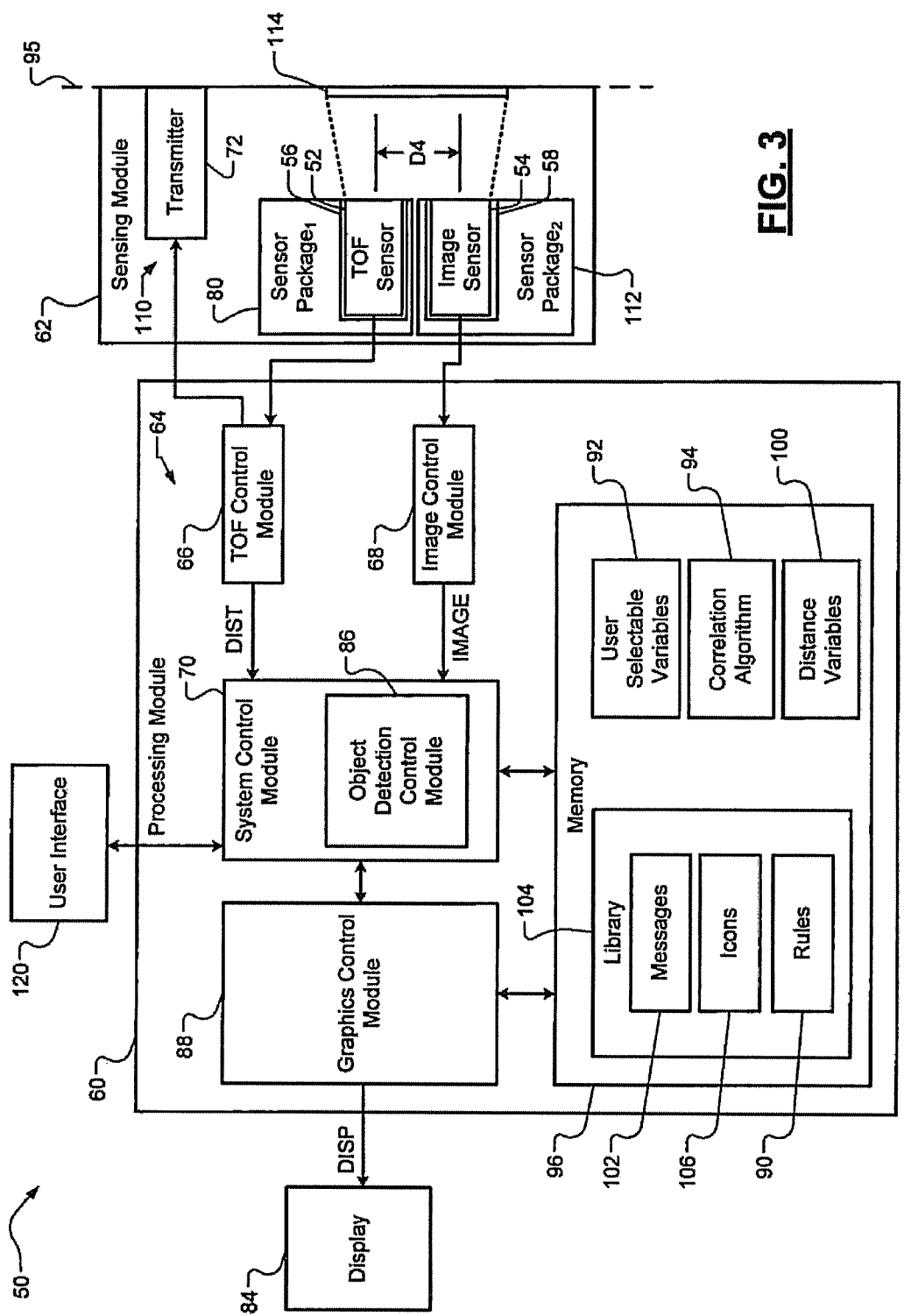
FIG. 3 is a functional block diagram of an object detection system incorporating a TOF sensor and an image sensor on separate substrates in accordance with the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Object detection sensors include, for example, time-of-flight (TOF) sensors and image sensors. The term TOF sensor refers to an array or collective group of TOF pixel sensors. The term TOF sensor may refer to all TOF pixel sensors on a substrate. Example TOF sensors are radar sensors, near infrared spectroscopy sensors, ultrasonic sensor, light sensors, phase detector, etc. The TOF sensors may detect light from a pulsed light source, radio frequency modulated light source, etc. The term image sensor refers to an array or collective group of image pixel sensors, such as red-green-blue (RGB) luminance pixel sensors. The term image sensor may refer to all image or luminance pixel sensors on a substrate. Example image sensors are a charge-coupled device (CCD), a complementary metal-oxide-semiconductor (CMOS) active-pixel sensor, etc. CCDs and CMOS active-pixel sensors are examples of RGB luminance pixel sensors.

A TOF system includes at least one TOF sensor and detects distances between the TOF sensor(s) and objects within range of the TOF sensor(s). As an example, a TOF system may calculate time of flight of an 850 nanometer (nm) burst of light. An image system includes at least one image sensor and detects objects within an environment. An image system is limited in its ability to accurately determine distances between the image sensors and the objects. For this reason, image sensor data is typically used to provide an image of an environment and is not used to provide distance information.

An object detection system that includes both a TOF dedicated sensor and an image dedicated sensor may provide both distance and image information with the advantages associated with TOF and image sensors. Collision avoidance and countermeasure tasks may be performed base on the distance and image information. This type of object detection system may be used to identify objects in an image that are within predetermined distances of a vehicle. The objects in an image may be highlighted or marked to indicate to an operator of a vehicle that the objects are within a warning or dangerous distance of the vehicle.

Referring now to FIGS. 1 and 2, top and side views of an object detection system 10 of a vehicle 12 are shown. The object detection system 10 may include a printed circuit board (PCB) 13 with a TOF sensor module 14 and an image sensor module 16. The sensor modules 14, 16 are used to collect both distance and image data associated with objects in an environment of the vehicle 12.

The TOF sensor module 14 may include a TOF dedicated sensor (TOF sensor) 18 and corresponding circuit components. The circuit components may include a TOF control module 20 that converts a TOF sensor signal TOF to a distance signal DIST. The signals TOF and DIST include distance data associated with detected objects.

The image sensor module 16 may include an image dedicated sensor (image sensor) 22 and corresponding circuit components. The circuit components may include an image control module 24 that converts an image sensor signal LUM to an image signal IMAGE. The signals LUM and IMAGE include luminance and/or image data including data associated with the detected objects. The TOF sensor 18 and the image sensor 22 may be located on an exterior surface of the vehicle 12 (e.g., on a vehicle bumper).

The distance and image data may be combined and shown on a display 26 to a vehicle operator via system and graphics control modules 28. The distance and image data may be used, for example, to indicate that an object is within predetermined distance(s) of the vehicle 12. This allows a vehicle countermeasure and/or collision avoidance system and/or the vehicle operator to perform countermeasures and avoid a collision with the object.

As an example, objects A and B are shown. In the example show, object A is centered on a normal plane 30 relative to a TOF/image plane 32 (or center of a TOF/image arc 34). The TOF/image arc 34 may be, for example, spherical shaped. Object B is located "off normal". An object is off normal when the object is not on (or centered on) the normal plane 30. Object B is off normal to the TOF/image plane 32 by an off normal angle α. Object A is shown approximately a distance D1 from the PCB 13, the modules 14, 16 and the lenses 39, 40. Object B is approximately a distance D2 from the PCB 13, the modules 14, 16 and the lenses 39, 40, where D2 is less than D1.

The normal plane 30 may extend from a reference plane 36 between the TOF and image sensor modules 14, 16. The normal plane 30 is perpendicular to the TOF/image plane 32. The normal plane 30 may also extend from and perpendicular to a vehicle driving surface (e.g., road) 42. The reference plane 36 may extend across a front surface of the TOF and image sensors 18, 22 and/or across front surfaces 37, 38 of the lenses 39, 40, as shown. The lenses 39 and 40 may be aligned relative to each other based on a reference, such as the reference plane 36 to prevent mismatching between data of the sensors 18, 22.

Figure 8:
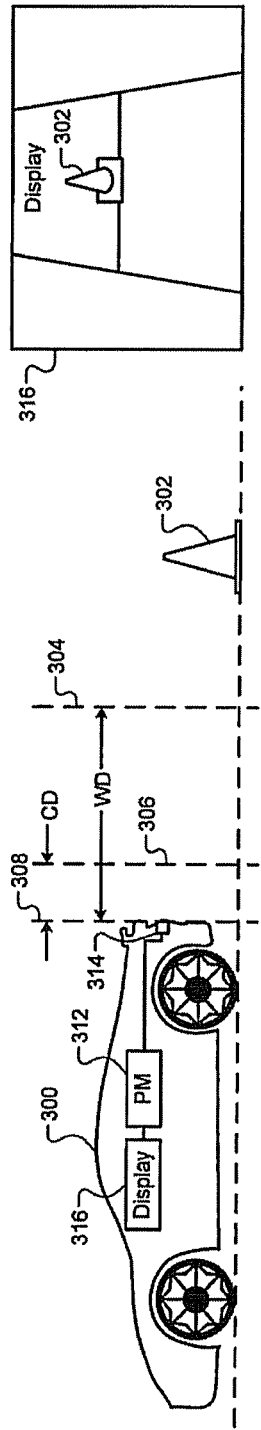
FIG. 8 is a side view of a vehicle and an impending object illustrating example warning and critical distances in accordance with the present disclosure.
Figure 9:
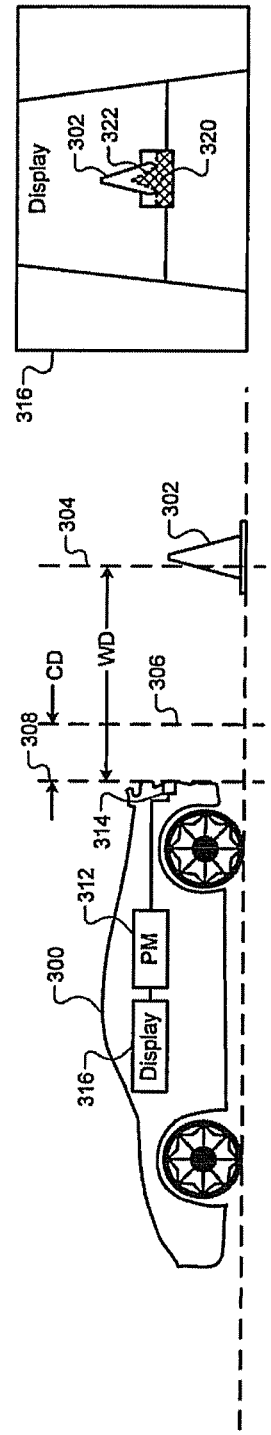
FIG. 9 is a side view of the vehicle and the impending object of FIG. 8 illustrating the object at the warning distance.
Figure 10:
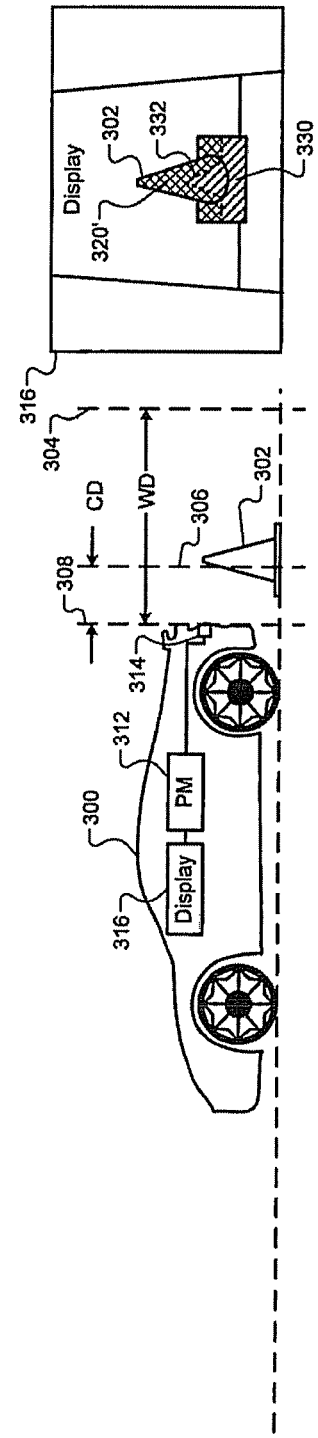
FIG. 10 is a side view of the vehicle and the impending object of FIG. 8 illustrating the object at the critical distance.

Although only one TOF/image plane (or TOF/image arc) is shown in FIG. 1, any number of TOF/image planes (or TOF/image arcs) may be used. The TOF/image plane 32 (or TOF/image arc 34) may be a predetermined distance from the PCB 13, the sensors 18, 22 and/or the lenses 39, 40. Other example TOF/image planes are shown in FIGS. 8-10.

Although the object detection system 10 provides both distance and image information, the distance information may include errors due to distance (e.g., distance D1) between centers of the sensors 18, 22 and/or between centers of the lenses 39, 40. The distance information may include errors, for example, when an object is located off normal relative to the TOF/image plane 32 (or center of the TOF/image arc 34), such as object B. Distance D3 between the TOF sensor 18 (or lens 39) and the image sensor 22 (or lens 40) may be, for example 25-50 millimeters (mm). The larger the distance D3 between the centers of the sensors 18, 22 and/or between the centers of the lenses 39, 40, the larger the errors. Also, the larger the off normal angle α, the larger the error.

One technique to compensate for an error due to distance between the centers of the sensors 18, 22 and/or between the centers of the lenses 39, 40 includes calculating the errors. Distance and/or image data is adjusted based on the calculator. The error is calculated based on the distance and the off angle (e.g., angle α) of the object. Although this technique may be used to compensate for the error, this technique causes processing delays. Implementations are described below that minimize distances between TOF and image sensors to minimize associated errors.

In FIG. 3, an object detection system 50 is shown incorporating a TOF sensor 52 and an image sensor 54 on separate or independent substrates 56, 58 (e.g., separate CMOS substrates). The object detection system 50 may be a forward, side and/or rear object detection system, a parking system, or other object detection system. The object detection system 50 includes a processing module 60 (e.g., first PCB) and a sensing module 62 (e.g., a second PCB). The processing module 60 includes a processing system 64 with a TOF control module 66, an image control module 68 and a system control module 70.

The TOF control module 64 receives a TOF sensor signal TOF from the TOF sensor 52. The TOF sensor signal TOF may be generated based on reflection of an object detection signal. The object detection signal is transmitted at a first time and the object detection signal is received by the TOF sensor 52 at a second time that is subsequent to the first time. The object detection signal may be generated via a transmitter 72 and reflected off objects proximate to the vehicle. The TOF control module 64 may generate the object detection signal via the transmitter 72. The transmitter 72 may be on the sensing module 62 (as shown), on the processing module 60, or on a first sensor package 80. The transmitter 72 may a radar transmitter, a near infrared spectroscopy transmitter, an ultrasonic transmitter, a light transmitter, etc.

The TOF control module 66 amplifies, filters and/or converts the TOF sensor signal TOF to a distance signal DIST. The signals TOF and DIST include distance data. The distance signal DIST includes vertical and horizontal TOF data that may be shown on a display 84 (e.g., graphical user interface (GUI)). The image control module 68 receives an image sensor signal LUM from the image sensor 54. The image sensor signal LUM may be associated with captured image data at the second time or time corresponding to collected TOF data. The image control module 68 amplifies, filters and/or converts the image sensor signal LUM to an image signal IMAGE. The signals LUM and IMAGE include luminance and/or image data. The image signal IMAGE includes vertical and horizontal image data that may be shown on the display 84.

The system control module 70 includes an object detection control module 86 and generates a combined TOF and image signal. The combined TOF and image signal is converted to a combined graphics signal that is shown on the display 84 via a graphics control module (GCM) 88. The object detection control module 86 combines distance and image data to generate the combined TOF and image signal.

The object detection control module 86 combines the distance and image data according to, for example, rules 90, user selectable variables 92 and correlation algorithms 94 stored in memory 96 and updated by the system control module 70. The rules 90 may include calibration rules used by correlation algorithms 94 to correlate TOF and image (or luminance) data from the TOF and image sensors 52, 54. The TOF and image data may include vertical and horizontal data. Data from TOF pixel sensors of the TOF sensor 52 is correlated with data from image pixel sensors of the image sensor 54 to generate the combined TOF and image signal.

The calibration rules may define physical relationships (including vertical and horizontal positions) between TOF pixel sensors and image pixel sensors. The physical relationships may include pixel sensor sizes, pixel sensor locations, and TOF-to-image pixel sensor correspondence information. The TOF-to-image pixel sensor correspondence information may include groupings of TOF and image pixel sensors and may identify the number of image pixel sensors that correspond to a particular TOF pixel sensor.

TOF-to-image pixel sensor correspondence may be a 1:1 relationship (i.e. same resolution between TOF and image pixel sensors). Correlation between the TOF and image pixel sensors may include miss-orientation correlation and not spatial location correlation when there is a 1:1 relationship. Miss-orientation correlation may be used when orientation of the TOF and image sensors and/or TOF and image pixel sensors are not orientated the same relative to a reference, such as reference plane 95. This corrects errors due to, for example, when the TOF sensor is rotated relative to the image sensor or is not aligned properly with the image sensor. Miss-orientation of sensors and/or pixel sensors can occur during manufacturing. Correlations between distance data and image data may be based on an angular offset, a horizontal offset, a vertical offset, and a longitudinal offset between the TOF sensor 52 and the image sensor 54 and/or between pixel sensors thereof.

Figure 4:
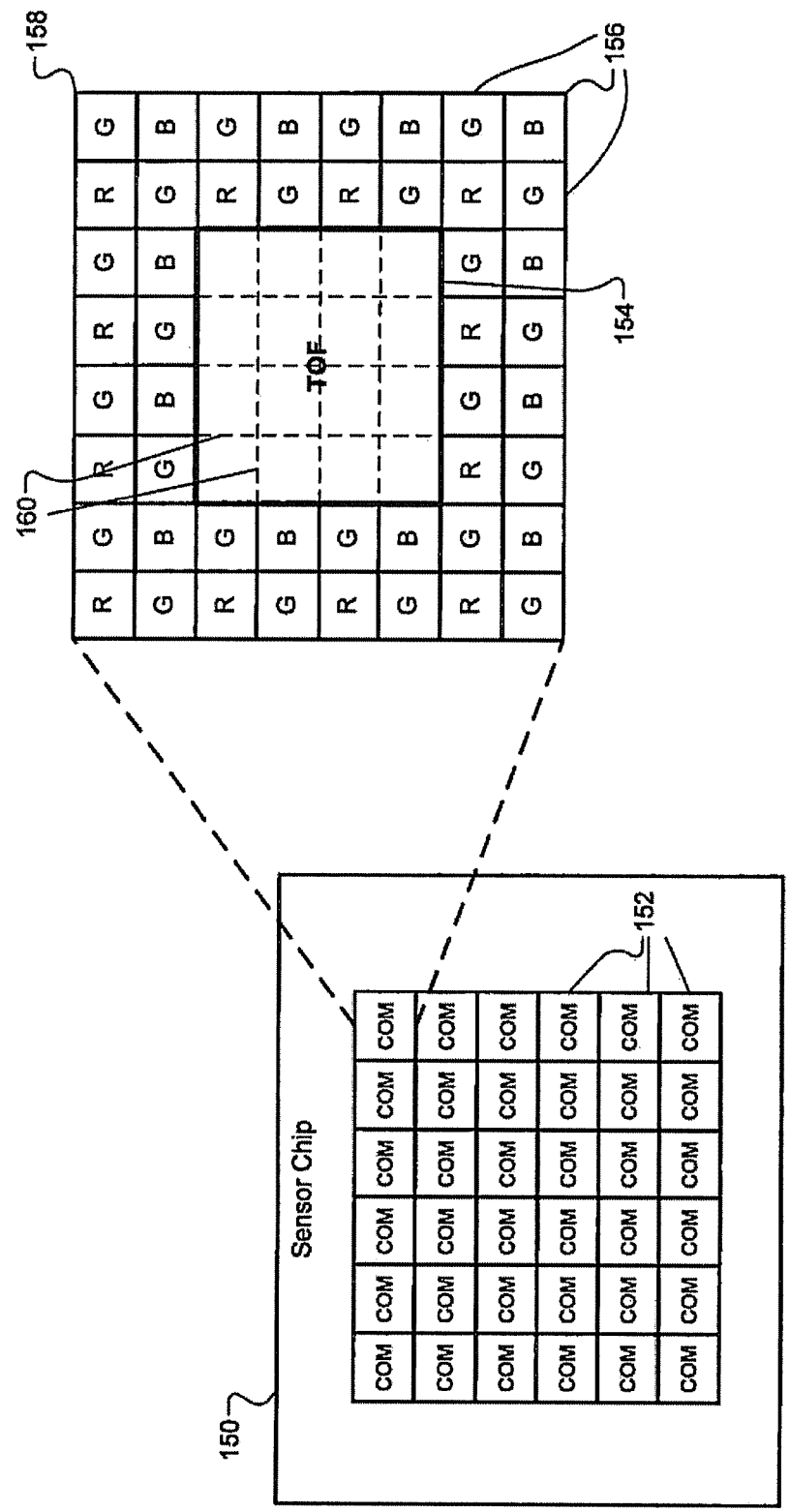
FIG. 4 is a functional block diagram of a sensor chip illustrating a center-of-mass implementation in accordance with the present disclosure.
Figure 7:
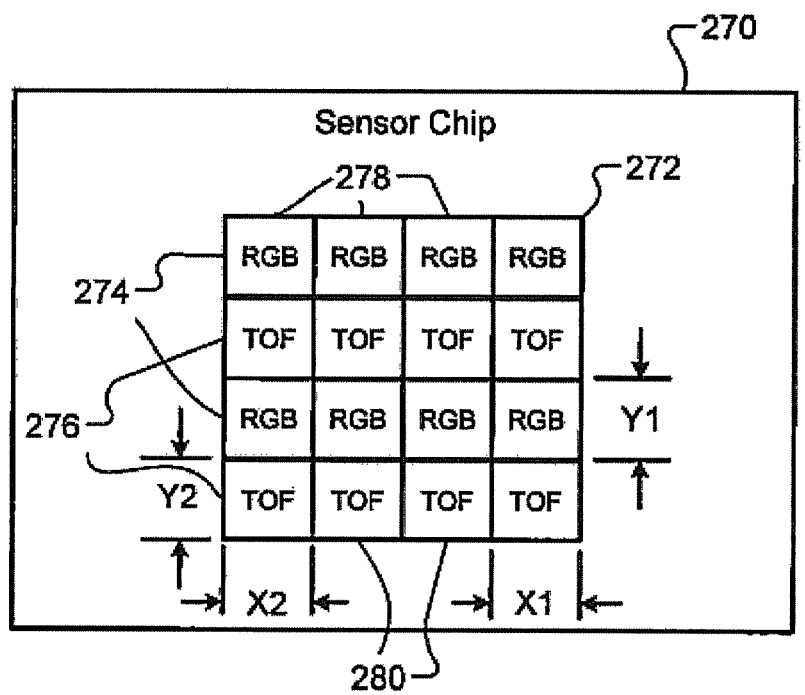
FIG. 7 is a top view of a sensor chip illustrating an example interlaced pixel sensor array in accordance with the present disclosure.

There may be a larger number of image pixel sensors relative to the number of TOF pixel sensors (e.g., N:1 relationship, where N is an integer greater than or equal to 2). For example, the image sensor 54 may have a video graphics array (VGA) resolution and the TOF sensor 52 may have a quarter VGA (QVGA) resolution (i.e. a 4:1 resolution ratio) based on the number of image and TOF pixel sensors. For example, sets of image pixel sensors may be grouped with a single TOF pixel sensor. As an example, 64 image pixel sensors may be grouped with a single TOF pixel sensor. Example TOF and image sensor arrangements are shown in FIGS. 4 and 7.

Although there may be more image pixel sensors than TOF pixel sensors, each of the TOF pixel sensors may have a larger surface area than each of the image pixel sensors. With the increased size, the TOF pixel sensors may be more sensitive than the image pixel sensors. The TOF pixel sensors may be sized larger that the image pixel sensors to maximize signal-to-noise ratios. This improves distance detection accuracy while allowing use of fewer TOF and/or image pixel sensors, which decreases overall sensor costs.

A total useful surface of the TOF and image sensors 52, 54 may refer to a surface where TOF and image sensor data intersect or overlap. The TOF data obtained from TOF pixel sensors may be dithered in space or time to smooth and/or soften intersection lines (or edges) of a display image. Intersection lines are shown in FIGS. 9 and 10. Anti-aliasing and matrix rotation coefficients may be used to filter and adjust orientation of TOF or warning indicators generated and displayed over an image. A TOF or warning indicator may refer to an intersection, a warning indicator overlaid onto a detected object, an arrow identifying a detected object, an arrow identifying a location of a detected object, etc.

The calibration rules and correlation algorithms 94 allow TOF information to be displayed over an image on the display 84. This may be done via software and/or based on physical locations of TOF and image pixel sensors. TOF information may be displayed over an image directly from data generated by TOF and image sensors associated with a center-of-mass, an interlaced or other mixed pixel arrangement between TOF and image pixel sensors. Examples of center-of-mass and interlaced arrangements are shown in FIGS. 4 and 7. In a mixed pixel arrangement, the TOF and image pixels are combined in a single sensor on a single substrate. The TOF information may be displayed over an image indirectly when the TOF and image sensors are adjacent and distinct sensors, as shown in FIG. 3. Software is used to overlap distance data with the image data when the TOF and image sensors are distinct sensors.

The object detection control module 86 also combines distance warning information with the distance and image data when generating the combined TOF and image signal. The distance warning information indicates when an object is within predetermined distances of a vehicle and/or indicates estimated distances of objects relative to the vehicle. Example predetermined distances are a warning distance (e.g., 8 meters (m)) and a critical distance (e.g., 3 m). Predetermined and estimated distances may be stored as distance variables 100 in the memory 96 and/or as messages 102, which may be indicated on the display 84. The messages 102 may also include warning text messages. Any number of predetermined distances and estimated distances may be stored and/or displayed. The predetermined distances, such as warning and critical distances, may be selected and/or set by a user and stored as part of the user selectable variables 92.

The user selectable variables 92 may include operation variables, indicator variables, display variables, warning variables, etc. The user selectable variables 92 and/or the operation variables may include brightness, contrast, luminance, or other pixel adjusting parameter used to adjust images or display pixels. The user selectable variables 92 may include a warning type variable that identifies whether a warning indicator is an audio, video, or vibration type indicator. A vibration type indicator may include vibrating a vehicle operator seat, a steering wheel, etc.

For example, a first type of audio, video and/or vibration alert may be generated when at least a portion of a detected object is within a warning distance. A second type of audio, video and/or vibration alert may be generated when at least a portion of a detected object is within a critical distance. Example video type indicators are shown in FIGS. 9 and 10.

The video type indicators may include coloring, blending, highlighting, flashing, marking, and transparency visual affects, which may be shown on the display 84. Portions and/or all of an impending object may be altered in color and/or transparency to indicate distance of that object. Examples of this are shown in FIGS. 8-10. The colors may be selected based on distance of the object. The impending object may be marked, for example, with an arrow, an intersection line, and/or highlighted such that relative position of the object is apparent to a vehicle operator. Portions or all of an object may be blended with semi-transparent colors, such as yellow or red.

The audio, visual, and vibration alerts may change with decreasing distance of an object relative to a vehicle. For example, louder audio indications and/or brighter colors may be used when an object is at a critical distance as opposed to when the object is at a warning distance. A few other examples include: adjusting vibration frequency; adjusting transparency percentages of a detected object and/or of a warning indicator; and adjusting flashing indicator frequency.

The memory 96 may include a library 104 with the rules 90, the messages 102 and icons 106. The icons 106 may be used as video type indicators to warn a vehicle operator of an impending object. An example icon may be a flashing box on or near the impending object and shown on the display 84.

The sensing module 62 includes a sensing system 110 with the first sensor package 80, a second sensor package 112 and a lens 114. The first sensor package 80 includes the TOF sensor 52 on the first substrate 56. The second sensor package 112 includes the image sensor 54 on the second substrate 58. The sensor packages 80, 112 may be adjacent to and/or in contact with each other to minimize distance D4 between the sensors 52, 54. The first and second sensor packages 80, 112 are independently located (distinct devices). The TOF and image sensors 52, 54 share the lens 114. Light may be focused on to pixel sensors of the TOF and image sensors 52, 54 by the lens 114.

In operation, the system control module 70 receives a user selection signal from a graphical user interface (GUI) 120. The GUI 120 may be a keypad, a keyboard, a voice recognition system, a touch screen, a mouse, etc. The system control module 70 updates parameters in the memory 96, such as the user selectable variables based on the user selection signal. The system control module 70 may instruct the object detection control module 86 to use a certain correlation algorithm when combining and comparing TOF and image data. The system control module 70 signals the GCM 88 based on TOF and image data received from the TOF and image control modules 66, 68. The GCM 88 generates a combined display signal DISP, which is shown on the display 84. The GCM 88 may access information, such as the user selectable variables 92 when generating the combined display signal DISP.

Figure 6:
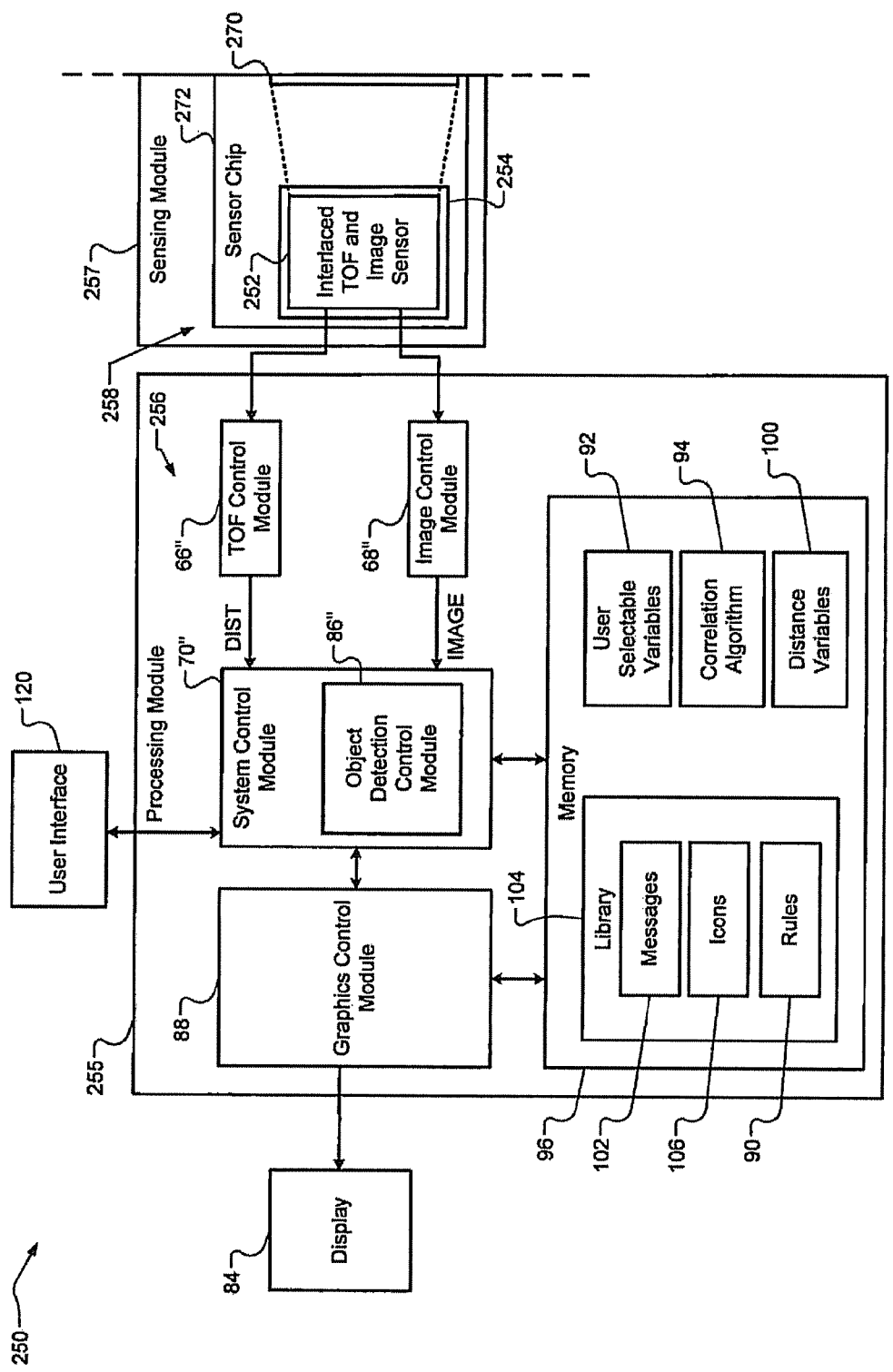
FIG. 6 is a functional block diagram of an object detection system incorporating an interlaced TOF and image sensor in accordance with the present disclosure.

In FIG. 4, a sensor chip (wafer) 150 is shown illustrating a center-of-mass implementation. The sensor chip 150 includes center-of-mass (COM) pixel sensor sets 152. Each of the COM pixel sensor sets 152 includes a TOF pixel sensor 154 and multiple image pixel sensors 156 (red (R), green (G), blue (B) pixels). The COM pixel sensor sets 152 may all be located on the same substrate 158, as shown or may be located on distinct substrates. An object detection system with a single substrate arrangement is shown in FIG. 6.

The pixel sensors of the COM pixel sensor sets 152 may be associated with pixels of a display. Although the TOF pixel sensor 154 is shown as being surrounded by image pixel sensors, TOF data may be modified to effectively overlap TOF information on an image and shown on the display. This is illustrated by dashed lines 160. The overlapping of TOF information on an image may also be performed via software when distinct TOF and image sensors are used. Although the TOF pixel sensor 154 is located in the center of the image pixel sensors 156, TOF to image data correspondence may be performed based on the vertical and horizontal location differences between the TOF and image pixel sensors 154, 156.

The image pixel sensors 156 may be in various patterns. In FIG. 4, the image pixel sensors 156 are shown in a RG GB (2×2) matrix pattern. The image pixel sensors 156 may include more pixel sensors of a certain color than pixel sensors of other colors. For example, in the example of FIG. 4 there are more green pixel sensors than red and blue pixel sensors. Other pixel sensor colors may be incorporated, such as yellow pixel sensors. The designated color of the pixel sensor may refer to color detected by that pixel sensor.

Although a certain number of image pixel sensors are shown with respect to a single TOF pixel sensor, other TOF-to-image pixel sensor ratios may be used and other TOF and image pixel sensor arrangements and patterns may be used. Another example is shown in FIG. 7.

As yet another example, the TOF pixel sensor of a pixel sensor set may have the same surface area as the image pixel sensors in that pixel sensor set. For example, a pixel sensor set may include a 2×2 matrix of image pixel sensors and a 2×2 matrix of TOF pixel sensors. The image pixel sensors may be approximately the same size as the TOF pixel sensors. Surface area of the 2×2 matrix of image pixel sensors may be the same as the surface area of the 2×2 matrix of TOF pixel sensors.

A further example includes a pixel sensor set with a 10×10 matrix of image pixel sensors and a single TOF pixel sensor. The surface area of the 10×10 matrix may be equal to the surface area of the TOF pixel sensor. As yet another example, a combined TOF and image sensor with VGA resolution (i.e. 640×480 pixels) may have at least half of the pixels allocated to luminance and the remaining pixel sensors allocated to TOF sensing.

Figure 5:
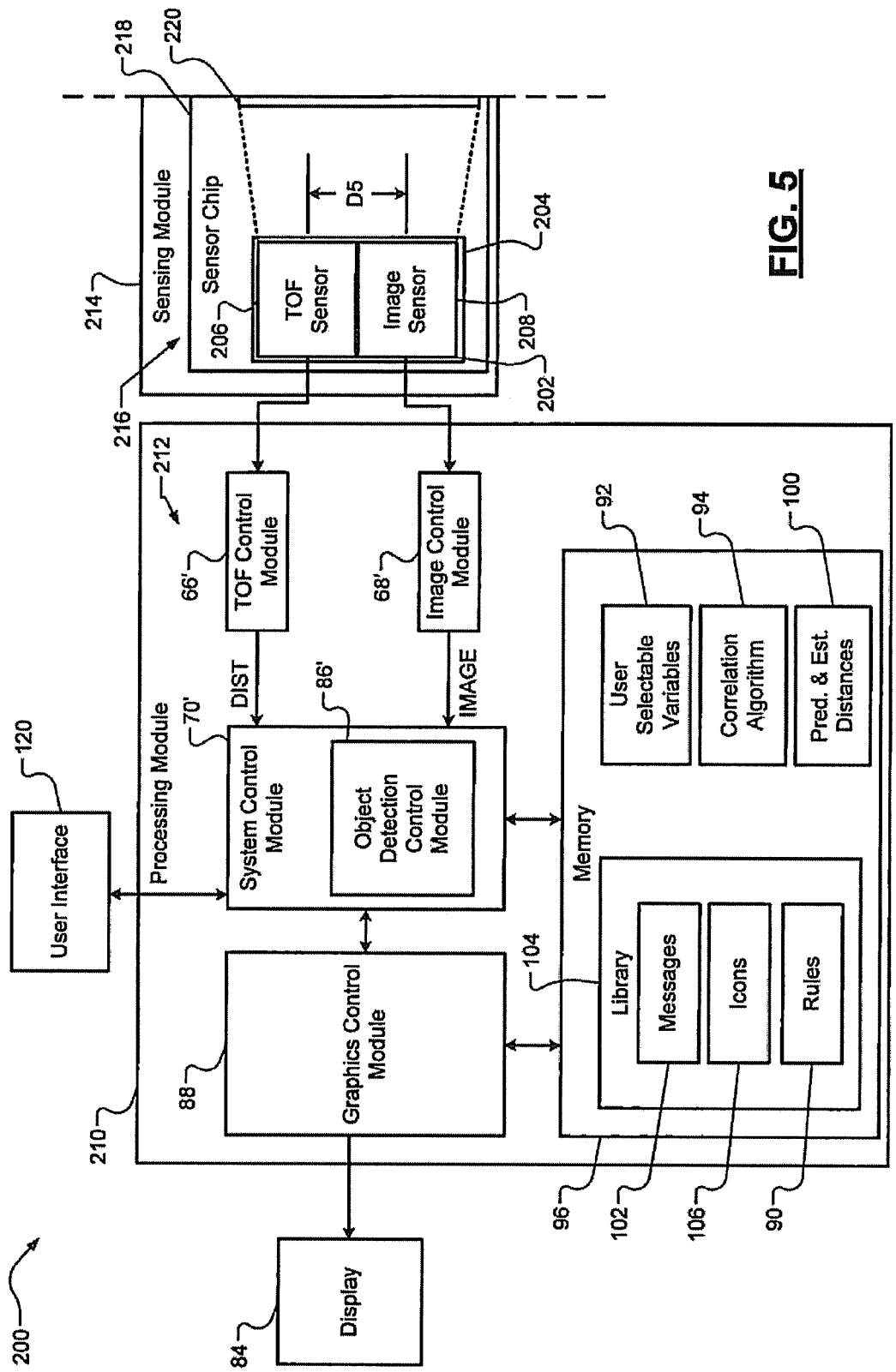
FIG. 5 is a functional block diagram of an object detection system incorporating a combined TOF and image sensor on a shared substrate in accordance with the present disclosure.

Referring now to FIG. 3 and FIG. 5, an object detection system 200 is shown incorporating a combined TOF and image sensor 202 on a shared substrate 204. Distance between TOF and image sensors is minimized and/or eliminated since TOF and image sensors 206, 208 of the combined TOF and image sensor 202 are located on the same substrate. Distance D5 between the TOF and image sensors 206, 208 is less than the distance D4 between the TOF and image sensors 52, 54. Distance D5 may be, for example, 5 millimeters (mm), which may decrease errors 5-10 times relative to errors associated with distance D4. This further reduces errors due to space between TOF and image pixels.

The object detection system 200 includes a processing module 210 with a processing system 212 and a sensing module 214 with a sensing system 216. The processing module 210 includes a TOF control module 66', an image control module 68' and a system control module 70' with an object detection control module 86'. The TOF and image control modules 66', 68' generate distance and image signals DIST and IMAGE based on TOF and image data from the TOF and image sensors 206, 208. The system control module 70' may generate a combined TOF and image signal, which is shown on the display 84 via the graphics control module 88. The object detection system 200 may include the memory 96 with the user selectable variables 92, the correlation algorithms 94, the distance variables 100, and the library 104. The library 104 may include the rules 90, the messages 102, and the icons. The correlation algorithms 94 may include an algorithm for the position arrangement of the TOF and image sensors 206, 208.

The sensing module 214 may include the sensing system 216 with a sensor chip 218. The sensor chip 218 may include the TOF sensor 206, the image sensor 208 and a lens 220. The TOF sensor 206 and the image sensor 208 are on the substrate 204. The TOF and image sensors 206, 208 share the lens 220. Light may be focused on to pixels of the TOF and image sensors 206, 208 by the lens 220. Although not shown, the sensing module 214 may include a transmitter, such as the transmitter 72.

Referring now to FIGS. 5 and 6, an object detection system 250 is shown incorporating an interlaced TOF and image sensor 252. Distances between TOF and image sensors is reduced or eliminated since TOF and image sensor pixels are interlaced on the same substrate 254. This further reduces errors due to space between TOF and image pixel sensors. An example row interlaced TOF and image sensor is shown in FIG. 7. TOF and image pixel sensors may be interlaced vertically and horizontally. Various different patterns of the TOF and image pixel sensors may be used.

An interlaced TOF and image sensor may refer to a sensor that includes rows and/or columns of alternating TOF and image pixel sensors. In the example shown, errors associated with pixel sensors in the horizontal direction are eliminated and errors associated with pixel sensors in the vertical direction are minimized. Thus, errors may be present in one direction and may be associated with distances between TOF and image pixel sensors of, for example, 0.1 mm. This reduces errors approximately 100 times relative to errors associated with distance D4 of FIG. 3. Reduced errors results in reduced error corrections and total processing time to generate a TOF overlaid video image. As the TOF and image pixel sensors of the interlaced TOF and image sensor 252 are in one (the same) plane, mechanical adjustments at the sensor level and software compensation due to sensor orientation are not needed.

In FIG. 7, a sensor chip 270 is shown illustrating an example interlaced TOF and image sensor 272 (or interlaced pixel sensor array). The interlaced TOF and image sensor 272 includes rows of image pixel sensors 274 (collectively the image sensor) and rows of TOF pixel sensors 276 (collectively the TOF sensor). As shown, the rows of image pixel sensors 274 include image (RGB) pixel sensor sets 278. Each image pixel sensor set 278 may include any number of image pixel sensors. As an example, an image pixel sensor set may include a RG GB (2×2) pixel sensor set. Columns of the interlaced TOF and image sensor 272 may alternate between image pixel sensor sets and TOF pixel sensors, as shown. Although surface area dimensions X1, Y1 of the image pixel sensor sets 278 are shown as being the same as surface area dimensions X2, Y2 of TOF pixel sensors 280, the dimensions X1, Y1 may be different than the dimensions X2, Y2.

Referring again to FIG. 6, the object detection system 250 includes a processing module 255 with a processing system 256 and a sensing module 257 with a sensing system 258. The processing module 255 includes a TOF control module 66", an image control module 68" and a system control module 70" with an object detection control module 86". The TOF and image control modules 66", 68" generate distance and image signals DIST and IMAGE based on TOF and image data from the TOF and image pixel sensors of the interlaced TOF and image sensor 252.

The system control module 70" may generate a combined TOF and image signal, which is shown on the display 84 via the graphics control module 88. The object detection system 250 may include the memory 96 with the user selectable variables 92, the correlation algorithms 94, the distance variables 100, and the library 104. The library 104 may include the rules 90, the messages 102 and the icons 106. The correlation algorithms 94 may include an algorithm for the position arrangement of the TOF and image pixel sensors.

The sensing module 257 includes the sensing system 258 with a sensor chip 272. The sensor chip 272 may include the interlaced TOF and image sensor 252 and a lens 270. The interlaced TOF and image sensor 254 is on the substrate 254. Light may be focused on to TOF and image pixels by the lens 270. Although not shown, the sensing module 257 may include a transmitter, such as the transmitter 72 of FIG. 3.

In FIGS. 8-10, side views of a vehicle 300 and an impending object 302 are shown illustrating an example warning distance (WD) and a critical distance (CD). Imaginary planes 304, 306 (invisible walls) are shown for the WD and CD relative to a reference plane 308. The reference plane 308 may refer to a sensor location on the vehicle 300 and/or a point on the vehicle 300 closest to the impending object 302 (e.g., outer surface of a bumper of the vehicle 300).

The vehicle 300 includes an object detection system 310, such as one of the object detection systems described above with respect to FIGS. 3, 5 and 6. The object detection system 310 includes a processing module 312 and a sensing module 314 that may include above described processing and sensing systems. Distance and image data is shown on a display 316. The displayed images may be two-dimensional or three-dimensional images.

In FIG. 8, the object 302 is farther from the vehicle 300 than the WD. For this reason, the object 302 is shown on the display 316, but no warning indicator and/or critical indicator are shown. Although not shown, distance of the object 302 may be shown on the display 316. For example, distance of the closest point of the object 302 to the vehicle 300 may be shown and decreasing as the object 302 becomes closer to the vehicle 300.

In FIG. 9, a portion of the object 302 is closer to the vehicle than the WD. For this reason, a warning indicator 320 is shown on the display 316. As show, the warning indicator 320 includes shading, highlighting, and/or changing color of the portion of the object 302 within the WD and on the display 316. An intersection line 322 is shown on the object 302, which corresponds to an intersection (contour) between the WD plane 304 and the object 302. The intersection line 322 may be highlighted.

In FIG. 10, a first portion of the object 302 is closer to the vehicle 300 than the CD and the whole object 302 is closer to the vehicle 300 than the WD. For this reason, warning and critical indicators 320', 330 are shown on the display 316. As show, the warning indicator 320' includes shading, highlighting, and/or changing color of a second portion of the object 302 that is within the WD, but is not within the CD using a first technique. This technique may include the same object modification(s) performed in FIG. 9. The critical indicator 330 includes shading, highlighting, and/or changing color of the first portion of the object 302 that is within the CD using a second technique. An intersection line 332 is shown on the object 302 and corresponds to an intersection between the CD plane 306 and the object 302.

As an example, the first technique may include changing the color of the second portion to a bright yellow color. The second technique may include changing the color of first portion to a bright red color. Various other WD and CD indicators may be used as described above.

Figure 11:
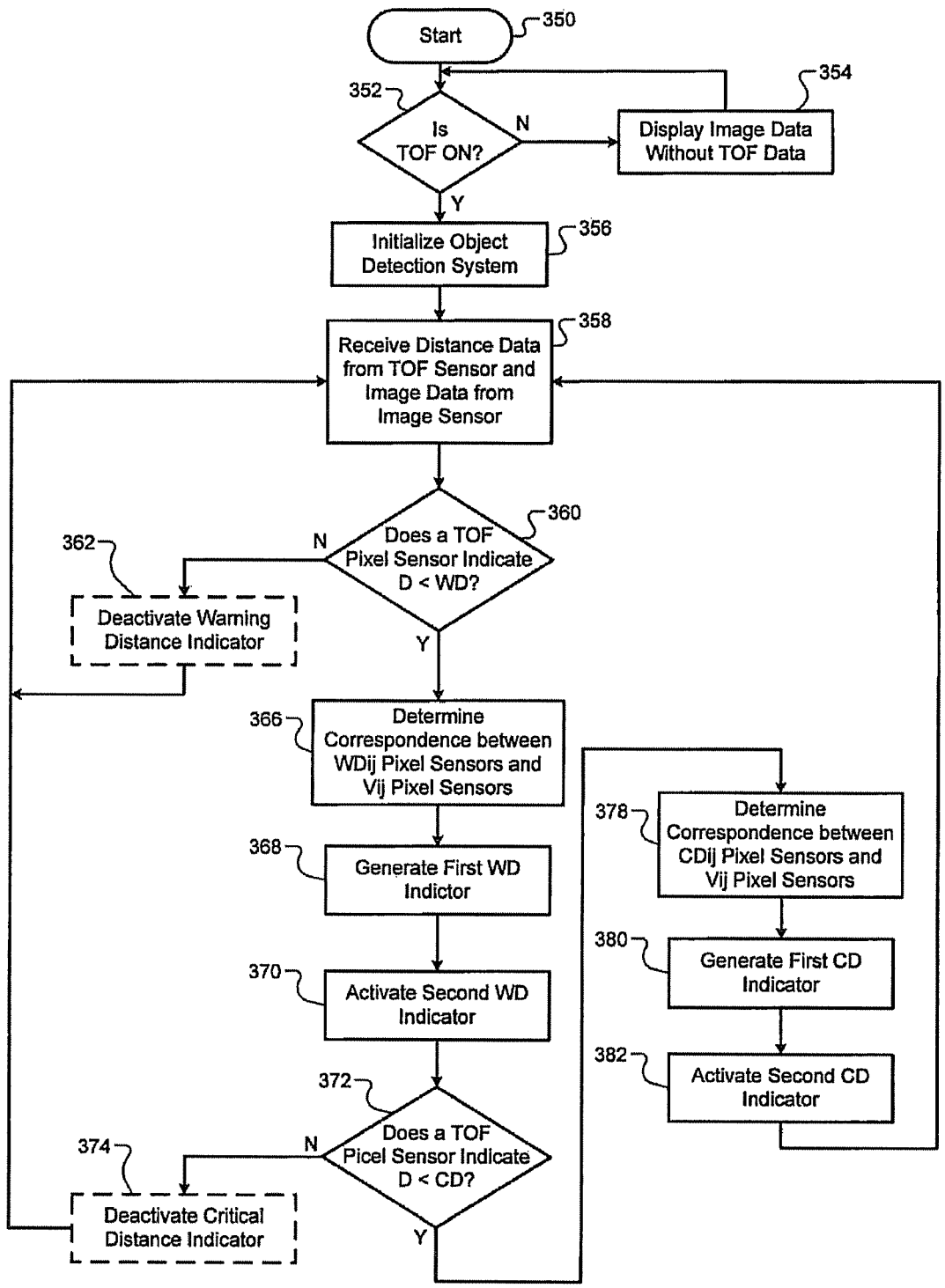
FIG. 11 illustrates a method of operating an object detection system in accordance with the present disclosure.

In FIG. 11, a method of operating an object detection system, such as one of the object detection systems shown in FIGS. 3, 5, 6 and 8-10, is shown. Although the following tasks are described primarily with respect to the systems of FIGS. 3, 4 and 6, the tasks may be applied to other implementations of the present disclosure. The method may begin at task 350.

At 352, a system control module may determine if TOF sensing is activated. Task 354 may be performed when TOF sensing is deactivated. Task 356 may be performed when TOF sensing is activated. Although task 352 is shown as being performed prior to task 356, task 352 may be performed subsequent to or during task 356. At 354, image data is displayed without TOF data.

At 356, the object detection system is initialized. Initialization may be performed by the system control module. This may include system calibration, establishing warning indicators including setting WD and CD distances, selecting warning and critical indicators, etc. System calibration may include creating a correspondence matrix (Mnm), where n is the number of rows and m is the number of columns in the matrix M. The correspondence matrix Mnm include correspondence values between TOF pixel sensors having associated detected distances Dij (or Dij pixel sensors) and image (or video) pixel sensors having associated image data Vkl (Vkl pixel sensors), where i, j, k, and l identify vertical and horizontal pixel locations of respective TOF and image pixel arrays. k may be greater than or equal to i. l may be greater than or equal to j.

The correspondence may be performed using a correlation algorithm stored in memory (e.g., one of the correlation algorithms 94). The WD and CD distances may be predetermined and stored distances or may be set and/or adjusted during startup of the object detection system. The WD and CD distances may be based on set or selected units of measure (e.g., English versus metric units).

The CD indicator may be set, for example, to blink and white highlight pixels of contours of displayed objects within the CD. The WD indicator may be set, for example, to increase luminance of an object displayed by 50% and/or provide a yellow contour on the object when within the WD. Other CD and WD indicators may be used.

At 358, a TOF control module and an image control module receive respectively TOF and image (or luminance) data. At 360, an object detection control module determines whether any TOF pixel sensors indicate that a portion of a detected object is within the WD. This occurs when a distance Dij of that pixel is less than the WD. The TOF pixel sensors associated with a portion of the object that is within the WD are identified and referred to as WDij pixel sensors. The WDij pixel sensors are a subset of the Dij pixel sensors. Task 362 may be performed when the TOF pixel sensors do not indicate that a portion of the object is within the WD, otherwise task 366 is performed. The WD indicator may be deactivated at 362. Task 358 may be performed after task 362.

At 366, the system control module and/or the object detection control module determine correspondence between the WDij pixel sensors and the image pixel sensors Vij to determine resultant WDVij pixel sensors or WDVkl pixel sensors. The WDVij pixel sensors are a subset of the WDij pixel sensors. The WDVkl pixel sensors refer to a subset of the Vkl pixel sensors corresponding to the WDVij pixel sensors. The correspondence may be performed using a correlation algorithm stored in memory (e.g., one of the correlation algorithms 94). The correspondence provides a surface (pixel sensors) on the image sensor that corresponds to surface (pixel sensors) of the TOF sensor that are within the WD. This correspondence may be performed using matrix correspondence.

At 368, the object detection control module may generate a first WD indicator, which may include adjusting luminance values of the WDVij or WDVkl pixel sensors and/or the associated display pixels. The luminance may be, for example, increased by 50% and/or be highlighted in yellow. Luminance values of the WDVij or WDVkl pixel sensors and/or the associated display pixels may be multiplied by a predetermined value to provide the increased luminance. A correspondence between pixel sensors and display pixels may be performed when there is not a 1:1 relationship between the pixel sensors and the pixels of the display.

As another example, the WDVij or WDVkl pixel sensors and/or the associated display pixels may be alpha blended with a warning color (e.g., 50% transparent yellow). As another example, an arrow may be displayed and used to point to a border or surface of the object with predetermined text, which may be alpha blended into the displayed image. The predetermined text may be obtained from messages in a library (such as the messages 102 of the memory 96). The arrow and predetermined text may change based on relative movement between the vehicle and the object.

At 370, a second WD indicator may be activated. The second WD indicator may include an audible or vibration warning. For example, a voice activated message may be transmitted to warn the vehicle operator of the impending object.

At 372, the object detection control module determines whether any TOF pixel sensors indicate that a portion of a detected object is within the CD. This occurs when distance Dij of that pixel is less than the CD. The TOF pixel sensors associated with a portion of the object that is within the CD are identified and referred to as CDij pixel sensors. The CDij pixel sensors are a subset of the Dij pixel sensors. Task 374 may be performed when the TOF pixel sensors do not indicate that a portion of the object is within the CD, otherwise task 378 is performed. The CD indicator may be deactivated at 374. Task 358 may be performed after task 374.

At 378, the system control module and/or the object detection control module determine correspondence between the CDij pixel sensors and the image pixel sensors Vkl to determine resultant CDVij pixel sensors or CDVkl pixel sensors. The CDVij pixel sensors are a subset of the CDij pixel sensors. The CDVkl pixel sensors are a subset of the Vkl pixel sensors. The correspondence may be performed using a correlation algorithm stored in memory (e.g., one of the correlation algorithms 94). The correspondence provides a surface (pixel sensors) on the image sensor that corresponds to surface (pixel sensors) of the TOF sensor that are within the CD. This correspondence may be performed using matrix correspondence.

At 380, the object detection control module may generate a first CD indicator, which may include blinking and/or white highlighting the CDVij or CDVkl pixel sensors, and/or associated display pixels. A correspondence between pixel sensors and display pixels may be performed when there is not a 1:1 relationship between the pixel sensors and the pixels of the display.

At 382, a second CD indicator may be activated. The second CD indicator may include an audible or vibration warning. For example, a seat of a vehicle operator may be vibrated to warn the vehicle operator of the impending object. Task 358 may be performed after task 382.

The above-described tasks are meant to be illustrative examples; the tasks may be performed sequentially, synchronously, simultaneously, continuously, during overlapping time periods or in a different order depending upon the application.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An object detection system of a vehicle comprising:
a time-of-flight (TOF) sensor receiving a reflected object detection signal at a second time based on an object detection signal transmitted at a first time;
an image sensor that generates an image signal including an image of a detected object, wherein the image sensor is distinct from and adjacent to the TOF sensor;
a TOF control module that generates distance and size data based on the first time and the second time and determines whether at least a portion of a detected object is within a predetermined distance of the vehicle;
an image control module that generates image data based on the image signal; and
a detection control module that correlates the distance and size data with the image data to generate a visual warning indicator when at least a portion of the detected object is within the predetermined distance of the vehicle, the visual warning indicator being proportionate in size to the portion of the detected object within the predetermined distance; wherein
the detected object is shown on a display and an intersection line is shown on the detected object, the intersection line corresponding to the portion of the detected object within the predetermined distance.

2. The object detection system of claim 1, further comprising:
a first chip package comprising the TOF sensor; and
a second chip package comprising the image sensor,
wherein the second chip package is adjacent to and in contact with the first chip package.

3. The object detection system of claim 1, wherein the detection control module correlates the distance and size data with the image data based on at least one of an angular offset, a horizontal offset, a vertical offset, and a longitudinal offset between the TOF sensor and the image sensor.

4. The object detection system of claim 1, further comprising a graphics control module, wherein:
the detection control module correlates the distance and size data with the image data to generate resultant correlated data based on resolution of the TOF sensor and resolution of the image sensor; and
the graphics control module, based on the resultant correlated data, at least one of (i) alters pixels of the display associated with the portions of the detected object that are within the predetermined distance and (ii) displays the visual warning indicator over a portion of the detected object on the display.

5. The object detection system of claim 1, wherein the detection control module:
dithers in at least one of space and time the distance and size data to generate dithered data; and
correlates the dithered data with the image data.

6. An object detection system comprising:
a substrate comprising:
a time-of-flight (TOF) sensor that includes N pixel sensors and receives a reflected TOF signal at a second time based on a TOF signal transmitted at a first time, where N is an integer;
an image sensor that (i) includes M pixel sensors distinct from the N pixel sensors and (ii) generates an image signal and that is adjacent to the TOF sensor, where M is an integer;
a TOF control module that (i) generates distance and size data based on the first time and the second time and (ii) determines whether at least a portion of a detected object is within a predetermined distance of a vehicle;
an image control module that generates image data based on the image signal; and
a detection control module that correlates the distance and size data with the image data to generate a first visual warning indicator when at least a portion of the detected object is within the predetermined distance of the vehicle, the first visual warning indicator being proportionate in size to the portion of the detected object within the predetermined distance; wherein the detected object is shown on a display and an intersection line is shown on the detected object, the intersection line corresponding to the portion of the detected object within the predetermined distance.

7. The object detection system of claim 6, wherein:
the TOF sensor comprises a first array of the N pixel sensors; and
the image sensor comprises a second array of the M pixel sensors,
wherein the second array of the M pixel sensors are interlaced with the first array of the N pixel sensors.

8. The object detection system of claim 7, wherein the second array of the M pixel sensors is interlaced at least one of vertically and horizontally with the first array of the N pixel sensors.

9. The object detection system of claim 6, further comprising a graphics control module, wherein:
the detection control module correlates the distance and size data with the image data to generate resultant correlated data based on resolution of the TOF sensor and resolution of the image sensor; and
the graphics control module, based on the resultant correlated data, at least one of (i) alters pixels of the display associated with the portions of the detected object that are within the predetermined distance and (ii) displays the visual warning indicator over a portion of the detected object on the display.

10. The object detection system of claim 6, further comprising:
a display; and
a graphics control module that displays the detected object and the first visual warning indicator on the display,
wherein the detection control module:
determines when portions of the detected object are with a warning distance and within a critical distance of a vehicle;
generates the first visual warning indicator when a portion of the detected object is within the warning distance;
generates a second visual warning indicator when a portion of the detected object is within the critical distance; and
displays the second visual warning indicator on the display, and
wherein the first visual warning indicator is different than the second visual warning indicator.

11. The object detection system of claim 6, wherein:
N is less than M; and
surface area of the N pixel sensors is equal to surface area of the M pixel sensors.

12. A method of operating an object detection system comprising:
generating a correspondence matrix between time-of-flight (TOF) pixel sensors of a TOF sensor and image pixel sensors of an image sensor;
receiving distance and size data from the TOF sensor;
receiving image data from the image sensor;
comparing the distance and size data to a warning distance and generating a visual warning indicator;
determining a first correspondence between a first subset of the TOF pixel sensors and at least one of (i) the image pixel sensors and (ii) pixels of a display, wherein the first subset of the TOF pixel sensors is associated with a portion of a detected object that is within the warning distance;
displaying the detected object and the visual warning indicator according to the first correspondence, the visual warning indicator being proportionate in size to the portion of the detected object within the warning distance; and
displaying an intersection line on the detected object, the intersection line corresponding to the portion of the detected object within the warning distance.

13. The method of claim 12, further comprising:
comparing the distance and size data to a critical distance and generating a critical indicator;
determining a second correspondence between a second subset of the TOF pixel sensors and at least one of (i) the image pixel sensors and (ii) pixels of the display, wherein the second subset of the TOF pixel sensors are associated with distances of the detected object that are within the critical distance; and
displaying the critical indicator according to the second correspondence,
wherein the visual warning indicator is different than the critical indicator.

14. The method of claim 13, further comprising:
increasing luminance and adjusting color of at least one of (i) the image pixel sensors and (ii) the pixels of the display corresponding to the first subset of the TOF pixel sensors when displaying the visual warning indicator; and
the critical indicator includes adjusting color of at least one of (i) the image pixel sensors and (ii) the pixels of the display corresponding to the second subset of the TOF pixel sensors when displaying the critical indicator.

15. The method of claim 14, further comprising:
highlighting at least one of (i) the image pixel sensors and (ii) the pixels of the display corresponding to the first subset of the TOF pixel sensors when displaying the visual warning indicator; and
blinking at least one of (i) the image pixel sensors and (ii) the pixels of the display corresponding to the second subset of the TOF pixel sensors when displaying the critical indicator.

16. The method of claim 15, further comprising:
generating a second visual warning indicator when distance and size data associated with TOF pixels of the TOF sensor indicates that a portion of the detected object is within the warning distance; and
generating a second critical indicator when distance and size data associated with TOF pixels of the TOF sensor indicates that a portion of the detected object is within the critical distance,
wherein the second visual warning indicator includes at least one of a first voice message and a first vibration indicator, and
wherein the second critical indicator includes at least one of a second voice message and a second vibration indicator.

17. The object detection system of claim 1, wherein the visual warning indicator includes at least one of shading, highlighting and changing color of the portion of the detected object.

18. The object detection system of claim 6, wherein the first visual warning indicator includes at least one of shading, highlighting and changing color of the portion of the detected object.

19. The method of claim 12, wherein the visual warning indicator includes at least one of shading, highlighting and changing color of the portion of the detected object.

20. An object detection system of a vehicle comprising:
- a time-of-flight (TOF) sensor receiving a reflected object detection signal at a second time based on an object detection signal transmitted at a first time;
- an image sensor that generates an image signal including an image of a detected object, wherein the image sensor is distinct from and adjacent to the TOF sensor;
- a TOF control module that generates distance data based on the first time and the second time and determines whether at least a portion of a detected object is within a predetermined distance of the vehicle;
- an image control module that generates image data based on the image signal; and
- a detection control module that correlates the distance data with the image data to generate a warning indicator when at least a portion of the detected object is within the predetermined distance of the vehicle, the warning indicator being proportionate to the portion of the detected object within the predetermined distance, wherein
- the warning indicator includes at least one of shading, highlighting and changing color of the portion of the detected object.

21. An object detection system comprising:
a substrate comprising:
- a time-of-flight (TOF) sensor that includes N pixel sensors and receives a reflected TOF signal at a second time based on a TOF signal transmitted at a first time, where N is an integer;
- an image sensor that (i) includes M pixel sensors distinct from the N pixel sensors and (ii) generates an image signal and that is adjacent to the TOF sensor, where M is an integer;
- a TOF control module that (i) generates distance data based on the first time and the second time and (ii) determines whether at least a portion of a detected object is within a predetermined distance of a vehicle;
- an image control module that generates image data based on the image signal; and
- a detection control module that correlates the distance data with the image data to generate a first warning indicator when at least a portion of the detected object is within the predetermined distance of the vehicle, the first warning indicator being proportionate to the portion of the detected object within the predetermined distance, wherein
- the first warning indicator includes at least one of shading, highlighting and changing color of the portion of the detected object.

22. A method of operating an object detection system comprising:
- generating a correspondence matrix between time-of-flight (TOF) pixel sensors of a TOF sensor and image pixel sensors of an image sensor;
- receiving distance data from the TOF sensor;
- receiving image data from the image sensor;
- comparing the distance data to a warning distance and generating a warning indicator;
- determining a first correspondence between a first subset of the TOF pixel sensors and at least one of (i) the image pixel sensors and (ii) pixels of a display, wherein the first subset of the TOF pixel sensors is associated with a portion of a detected object that is within the warning distance; and
- displaying the detected object and the warning indicator according to the first correspondence, the warning indicator being proportionate to the portion of the detected object within the warning distance, wherein
- the warning indicator includes at least one of shading, highlighting and changing color of the portion of the detected object.

23. The object detection system of claim 1, wherein the detected object is larger than a threshold.

24. The object detection system of claim 6, wherein the detected object is larger than a threshold.

25. The method of claim 12, wherein the detected object is larger than a threshold.

* * * * *